United States Patent
Zhang et al.

(10) Patent No.: US 10,499,063 B2
(45) Date of Patent: Dec. 3, 2019

(54) METHOD AND APPARATUS FOR PREDICTION MODE AND PARTITION MODE SYNTAX CODING FOR CODING UNITS IN HEVC

(75) Inventors: Ximin Zhang, San Jose, CA (US); Shan Liu, San Jose, CA (US)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 405 days.

(21) Appl. No.: 14/342,357

(22) PCT Filed: Aug. 29, 2012

(86) PCT No.: PCT/US2012/052732
§ 371 (c)(1),
(2), (4) Date: Feb. 28, 2014

(87) PCT Pub. No.: WO2013/039692
PCT Pub. Date: Mar. 21, 2013

(65) Prior Publication Data
US 2014/0211850 A1    Jul. 31, 2014

Related U.S. Application Data

(60) Provisional application No. 61/535,463, filed on Sep. 16, 2011.

(51) Int. Cl.
*H04N 19/157* (2014.01)
*H04N 19/159* (2014.01)
(Continued)

(52) U.S. Cl.
CPC ........... *H04N 19/159* (2014.11); *H04N 19/13* (2014.11); *H04N 19/174* (2014.11); *H04N 19/70* (2014.11)

(58) Field of Classification Search
CPC ................ H04N 19/00212; H04N 19/159
(Continued)

(56) References Cited

U.S. PATENT DOCUMENTS

| | | | | |
|---|---|---|---|---|
| 7,680,185 B2 * | 3/2010 | Mukerjee | ............. | H04N 19/105 348/305 |
| 8,526,495 B2 * | 9/2013 | Liu | ...................... | H04N 19/159 375/240.12 |

(Continued)

FOREIGN PATENT DOCUMENTS

| | | |
|---|---|---|
| EP | 2 575 366 | 4/2013 |
| WO | WO 2013/070353 | 5/2013 |

OTHER PUBLICATIONS

NPL—Recent developments in standardization of HEVC—Set—2010; Sullivan-Ohm.*

(Continued)

*Primary Examiner* — Luis Perez-Fuentes
(74) *Attorney, Agent, or Firm* — McClure, Qualey & Rodack, LLP

(57) ABSTRACT

A method and apparatus for coding of syntax elements are disclosed to allow prediction units in P and B slices to share the same syntax coding table. In one embodiment according to the present invention, the method and apparatus coding of syntax elements selectively apply a syntax coding table to encode or decode the syntax element associated with the partition mode of a coding unit of a picture region according to the slice type of the picture region. A first syntax coding table is used to process the syntax element if the slice type is an I mode and a second syntax coding table is used to process the syntax element if the slice type is not an I mode.

16 Claims, 3 Drawing Sheets

(51) Int. Cl.
*H04N 19/70* (2014.01)
*H04N 19/13* (2014.01)
*H04N 19/174* (2014.01)

(58) Field of Classification Search
USPC .................................................. 375/240.12
See application file for complete search history.

(56) References Cited

U.S. PATENT DOCUMENTS

| | | | | |
|---|---|---|---|---|
| 8,885,704 B2* | 11/2014 | Chien | ................... | H04N 19/463 375/240.01 |
| 8,995,526 B2* | 3/2015 | Karczewicz | ......... | H04N 19/105 375/240.15 |
| 8,995,527 B2* | 3/2015 | Panchal | ................. | H04N 19/70 375/240.15 |
| 9,083,374 B2* | 7/2015 | Marpe | ..................... | H03M 7/40 |
| 9,161,057 B2* | 10/2015 | Karczewicz | ......... | H04N 19/105 |
| 9,172,976 B2* | 10/2015 | Chien | ................. | H03M 7/4018 |
| 9,258,565 B1* | 2/2016 | Jacob | .................... | H04N 19/13 |
| 9,357,229 B2* | 5/2016 | Chien | ................. | H04N 19/52 |
| 9,648,334 B2* | 5/2017 | Zheng | ................. | H04N 19/197 |
| 2002/0085637 A1* | 7/2002 | Henning | ............ | H04N 21/2383 375/240.14 |
| 2009/0196517 A1* | 8/2009 | Divorra Escoda | ... | H04N 19/176 382/240 |
| 2010/0086031 A1* | 4/2010 | Chen | .................... | H04N 19/176 375/240.12 |
| 2011/0170012 A1* | 7/2011 | Cheon | .................... | H04N 19/46 348/725 |
| 2011/0194613 A1* | 8/2011 | Chen | .................... | H04N 19/176 375/240.24 |
| 2011/0206123 A1* | 8/2011 | Panchal | ................. | H04N 19/70 375/240.15 |
| 2011/0293004 A1* | 12/2011 | An | ....................... | H04N 19/119 375/240.13 |
| 2011/0310966 A1* | 12/2011 | Sankaran | ............. | H04N 19/159 375/240.12 |
| 2012/0082210 A1* | 4/2012 | Chien | ................... | H04N 19/463 375/240.02 |
| 2012/0082224 A1* | 4/2012 | Van Der Auwera | ....................... H04N 19/176 375/240.12 | |
| 2012/0106629 A1* | 5/2012 | Zheng | ................. | H04N 19/176 375/240.02 |
| 2012/0106649 A1* | 5/2012 | Wang | ................. | H04N 19/159 375/240.18 |
| 2012/0147971 A1* | 6/2012 | Chien | .................... | H03M 7/40 375/240.23 |
| 2012/0195366 A1* | 8/2012 | Liu | ...................... | H04N 19/159 375/240.02 |
| 2012/0230397 A1* | 9/2012 | Ouedraogo | ............ | H04N 19/70 375/240.03 |
| 2012/0307894 A1* | 12/2012 | Chien | .................. | H04N 19/176 375/240.12 |
| 2012/0320990 A1* | 12/2012 | Chen | ................ | H04N 19/00024 375/240.25 |
| 2013/0003823 A1* | 1/2013 | Misra | ................... | H04N 19/129 375/240.02 |
| 2013/0003829 A1* | 1/2013 | Misra | ................... | H04N 19/174 375/240.12 |
| 2013/0177079 A1* | 7/2013 | Kim | ...................... | H04N 19/593 375/240.12 |
| 2014/0140400 A1* | 5/2014 | George | ................. | H04N 19/52 375/240.12 |
| 2014/0140404 A1* | 5/2014 | Liu | .................. | H04N 19/00024 375/240.12 |

OTHER PUBLICATIONS

Working Draft 4—High-Efficiency Video Coding, Jul. 2011; Bross, et. al.*
WD 4—HEVC coding. Jul. 2011; Bross.*
Working Draft 4—High Efficiency Video Coding Jul. 2011; Bross.*
Bross; et al. WD-4; High Efficiency Video Coding Jul. 2011; (Year: 2011).*
NPL: Bross; et al. WD-4; High Efficiency Video Coding Jul. 2011; Bross (Year: 2011).*
Overview of the H.264_AVC video coding standard; Wiegand; 2003 (Year: 2003).*
NPL Google searxh.pdf; 2019. (Year: 2019).*
Bross, B., et al.; "Working Draft 4 of High-Efficiency Video Coding;" Joint Collaborative Team on Video Coding (JCT-VC) of ITU-T SG16 WP3 and ISO/IEC JTC1/SC29/WG11; Jul. 2011; pp. 1-229.
Schwarz, H., et al.; "CABAC and Slices;" Joint Video Team (JVT) of ISO/IEC MPEG & ITU-T VCEG (ISO/IEC JTC1/SC29/WG11 and ITU-T SG16 Q.6); Jul. 2002; pp. 1-17.
Wiegand, T., et al.; "Joint Final Committee Draft (JFCD) of Joint Video Specification;" Joint Video Team (JVT) of ISO/IEC MPEG and ITU-T VCEG; Jul. 2002; pp. 1-191.
Zhang, X., et al.; "Prediction and Partition Mode Binarization for Low Delay P;" Joint Collaborative Team on Video Coding (JCT-VC) of ITU-T SG16 WP3 and ISO/IEC JTC1/SC29/WG11; Nov. 2011; pp. 1-4.
Chien, W.J., et al.; "Context Reduction for CABAC;" Joint Collaborative Team on Video Coding (JCT-VC) of ITU-T SG16 WP3 and ISO/IEC JTC1/SC29/WG11; Nov. 2011; pp. 1-8.
Piao, Y., et al.; "Unified Pred_type Coding in CABAC;" Joint Collaborative Team on Video Coding (JCT-VC) of ITU-T SG16 WP3 and ISO/IEC JTC1/SC29/WG11; Nov. 2011; pp. 1-3.

* cited by examiner

METHOD AND APPARATUS FOR PREDICTION MODE AND PARTITION MODE SYNTAX CODING FOR CODING UNITS IN HEVC

CROSS REFERENCE TO RELATED APPLICATIONS

The present invention claims priority to U.S. Provisional Patent Application Ser. No. 61/535,463, filed on Sep. 16, 2011, entitled "Method of CU mode syntax coding for low delay P picture in HEVC". The U.S. Provisional Patent Application is hereby incorporated by reference in its entirety.

FIELD OF THE INVENTION

The present invention relates to video coding. In particular, the present invention relates to coding techniques for syntax elements associated with prediction mode and partition mode for coding units in HEVC.

BACKGROUND

HEVC (High Efficiency Video Coding) is an advanced video coding system being developed under the Joint Collaborative Team on Video Coding (JCT-VC) group of video coding experts from ITU-T Study Group. In HEVC, a 2N×2N coding unit (CU) can be hierarchically partitioned into a partition size selected from 2N×2N, 2N×N, N×2N and N×N. The current HEVC also defines the prediction unit (PU), where a CU may consist of one or multiple PUs. There are various types (or partition types) regarding how a CU is partitioned into PUs. For example, an Intra 2N×2N CU may consist of one 2N×2N PU if it is greater than the smallest coding unit (SCU); or it may consist of either one 2N×2N PU or four N×N PUs if it is an SCU. An Inter 2N×2N CU may consist of one 2N×2N PU, two rectangular PUs (e.g. 2N×N or N×2N), or four N×N PUs if it is an SCU. FIG. 1A illustrates possible symmetrical partitions for an inter 2N×2N CU according to HEVC. When a 2N×2N CU is partitioned into two rectangular PUs, asymmetrical partitions may also be used. FIG. 1B illustrates asymmetrical partitions, 2N×nU, 2N×nD, nL×2N, and nR×2N that are allowed for HEVC. In HEVC, an Inter coded slice may be coded in P mode or B mode, where a slice is a picture region typically consisting of one or more rows of LCUs (Largest CUs). Furthermore, in HEVC, a list of reference pictures is used for uni-prediction of a P or B slice. For the coding process of a P slice, there is one reference picture list (list 0 or list 1). For the coding process of a B slice, there are two reference picture lists (list 0 and list 1). In HEVC Working Draft 4 (HEVC WD4) (*WD4: Working Draft 4 of High-Efficiency Video Coding*, Bross, et. al., JCTVC-F803, Joint Collaborative Team on Video Coding (JCT-VC) of ITU-T VCEG and ISO/IEC MPEG, Torino, Italy, July 2011), the prediction mode and partition mode binarization are defined as shown in Table 1. For a P slice, the CUs in the slice usually are processed according to P mode. Likewise, for a B slice, the PUs in the slice usually are processed according to B mode. Nevertheless, the PU in a P or B slice may also be processed according to I mode. Accordingly, Intra coding mode for P and B slices are also included in Table 1. In the case that Intra mode is not allowed for PUs in a P or B slice, all PUs in the P or B slice will only use MODE_INTER.

TABLE 1

| | | | | Bin string | | |
| | | | | | cLog2CUSize == Log2MinCUSize | |
| Slice type | Value of pred_type | PredMode | PartMode | cLog2CUSize > Log2MinCUSize (Condition 1) | cLog2CUSize == 3 && !inter_4x4_enabled_flag (Condition 2) | cLog2CUSize > 3 \|\| inter_4x4_enabled_flag (Condition 3) |
|---|---|---|---|---|---|---|
| I | 0 | MODE_INTRA | PART_2Nx2N | — | 1 | 1 |
|  | 1 | MODE_INTRA | PART_NxN | — | 0 | 0 |
| P | 0 | MODE_INTER | PART_2Nx2N | 0 1 | 0 1 | 0 1 |
|  | 1 | MODE_INTER | PART_2NxN | 0 011 | 0 01 | 0 01 |
|  | 2 | MODE_INTER | PART_Nx2N | 0 001 | 0 00 | 0 001 |
|  | 4 | MODE_INTER | PART_2NxnU | 0 0100 | — | — |
|  | 5 | MODE_INTER | PART_2NxnD | 0 0101 | — | — |
|  | 6 | MODE_INTER | PART_nLx2N | 0 0000 | — | — |
|  | 7 | MODE_INTER | PART_nRx2N | 0 0001 | — | — |
|  | 3 | MODE_INTER | PART_NxN | — | — | 0 000 |
|  | 8 | MODE_INTRA | PART_2Nx2N | 1 | 11 | 11 |
|  | 9 | MODE_INTRA | PART_NxN | — | 10 | 10 |
| B | 0 | MODE_INTER | PART_2Nx2N | 1 | 1 | 1 |
|  | 1 | MODE_INTER | PART_2NxN | 011 | 01 | 01 |
|  | 2 | MODE_INTER | PART_Nx2N | 001 | 001 | 001 |
|  | 4 | MODE_INTER | PART_2NxnU | 0100 | — | — |
|  | 5 | MODE_INTER | PART_2NxnD | 0101 | — | — |
|  | 6 | MODE_INTER | PART_nLx2N | 0000 | — | — |
|  | 7 | MODE_INTER | PART_nRx2N | 0001 | — | — |
|  | 3 | MODE_INTER | PART_NxN | — | — | 0001 |
|  | 8 | MODE_INTRA | PART_2Nx2N | 000 | 000 0 | 0000 0 |
|  | 9 | MODE_INTRA | PART_NxN | — | 000 1 | 0000 1 |

In Table 1, the value of pred_type (specifying a prediction type) is used to designate an allowed PredMode (specifying a prediction mode) and PartMode (specifying a partition mode) combination. For example, there are two possible values, 0 and 1, for an I slice and there are 10 possible values, 0 through 9, for a P or B slice. Syntax element inter_4x4_enabled_flag specifies whether inter prediction can be applied to blocks having the size of 4×4 luma samples. Variable cLog2CUSize specifies the current CU size and Log2MinCUSize specifies the minimum coding block size. As shown in Table 1, code tables or bin string tables are different for P slice and B slice for each of three coding conditions. The three coding conditions correspond to (1) the case that cLog2CUSize>Log2MinCUSize, (2) the case that cLog2CUSize==Log2MinCUSize and cLog2CUSize==3 && !inter_4×4 enabled_flag, and (3) the case that cLog2CUSize==Log2MinCUSize and cLog2CUSize>3|| inter_4×4 enabled_flag. For each coding condition, three code tables are used for I, P and B slices respectively. Accordingly, three sets of code tables or bin string tables are used for three coding conditions in Table 1. In HEVC, the N×N PU is not allowed when "cLog2CUSize>Log2MinCUSize". In other words, only 2N×2N PU is allowed for I slice and there is no need to code this prediction and partition mode combination. Therefore, there are no code entries in this case (as indicated by "-" in Table 1) for the I slice. Similarly, the PART_2N×nU, PART_2N×nD, PART_2N×nL, and PART_2N×nR are not allowed when "cLog2CUSize==Log2MinCUSize". Accordingly, there are no code entries in this case (as indicated by "-" in Table 1) for P and B slices. Furthermore, when "cLog2CUSize==Log2MinCUSize" and "cLog2CUSize==3 && !inter_4×4 enabled_flag", Inter N×N is not allowed for P and B slices. Accordingly, there is no need to include code entries for these cases in Table 1.

According to HEVC WD 4, coding units in a P slice use different mode syntax coding (binarization) from coding units in a B slice. As shown in Table 1, for each coding condition, individual sets of codes are used for CUs in I, P and B slices respectively as indicated by thick-lined boxes. The set of codes for a P slice is different from the set of codes for a B slice. Furthermore, in HEVC WD4, the Intra mode has the highest priority (i.e., "1", shortest codeword in Table 1) for PUs in the P slice, while the INTER_2N×2N has the highest priority for the B-coded PU than the P-coded PU. The use of separate syntax coding tables for P and B slices may increase system complexity. Therefore it is desirable to develop a scheme to allow unified syntax coding table for P and B slices to share.

BRIEF SUMMARY OF THE INVENTION

A method and apparatus for coding of syntax elements are disclosed to allow coding units in P and B slices to share the same syntax coding table. In one embodiment according to the present invention, the method and apparatus coding of syntax elements selectively apply a syntax coding table to encode or decode the syntax element associated with the partition mode of a block in a picture region according to the picture-region type. A first syntax coding table is used to process the syntax element if the picture-region type is an I mode and a second syntax coding table is used to process the syntax element if the picture-region type is not an I mode. The picture region may correspond to a slice, a group of coding units (CUs), a group of largest CUs, or a title consisting of a first number of CUs vertically and a second number of CUs horizontally. The block may correspond to a coding unit. The partition mode belongs to a group comprising 2N×2N, 2N×N, N×2N and N×N. The group may further comprise asymmetrical partition modes such as 2N×nU, 2N×nD, nL×2N and nR×2N partition modes. The second syntax coding table can be different for different coding conditions. The second syntax coding table corresponds to a variable length code table.

DETAILED DESCRIPTION OF THE INVENTION

Figure 1A:
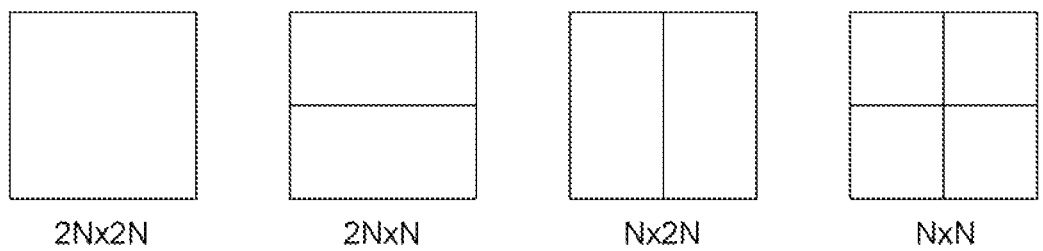
FIG. 1A illustrates 2N×2N, 2N×N, N×2N and N×N partition modes for a 2N×2N coding unit in High-Efficiency Video Coding (HEVC).
Figure 1B:
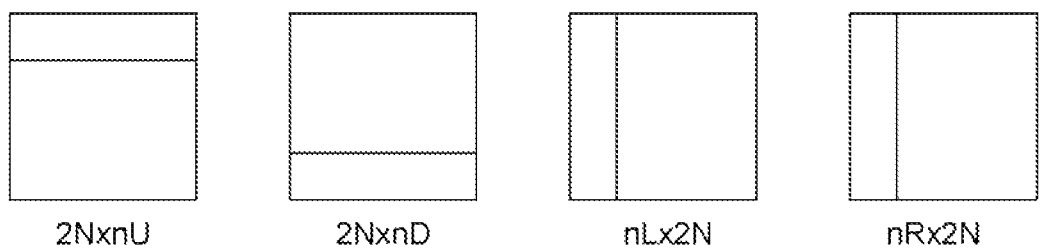
FIG. 1B illustrates 2N×nU, 2N×nD, nL×2N, and nR×2N asymmetrical partition modes for a 2N×2N coding unit when the 2N×2N coding unit is partitioned into two rectangular partitions in High-Efficiency Video Coding (HEVC).

As mentioned previously, it is desirable to develop a scheme that allows P slices and B slices to share unified syntax coding so that the system complexity can be reduced. Accordingly, the present invention discloses improved syntax coding for prediction mode and partition mode of HEVC. In one embodiment of the present invention, the slice type is checked first in order to select a corresponding coding table. If the slice type indicates the underlying slice is an I slice, a first syntax coding table is used to code the syntax element associated with the prediction mode and partition mode of the CU in the I slice. If the slice type indicates the slice is not an I slice, a second syntax coding table is used to code the syntax element associated with the prediction mode and partition mode of the CU in a non-I slice. In HEVC, the non-Intra coded slice can be either a P slice or a B slice. Consequently, CUs in the P slice and the B slice share the same syntax coding table for each of the three coding conditions to code prediction mode and partition mode according to the present invention.

In the above example, a slice is an example of a picture region for PUs within this picture region to apply a prediction mode according to the prediction type of the picture region. The picture-region type may be an I, P or B type. Coding units within the picture region will be predicted according to the picture-region type. For example, if the picture region (such as a slice) is designated as an Intra coded picture region, CUs within this picture region will use Intra prediction. On the other hand, if the picture region is designated as a P or B coded picture region, CUs within this picture region will primarily use P or B prediction mode. However, it is also possible to allow a CU in a P or B picture region to use I prediction mode. While the slice is used as an exemplary picture region, other picture regions may also be used. For example, a group of CUs, a group of largest CUs (LCUs), or a title consisting of a first number of CUs vertically and a second number of CUs horizontally may also be used as a picture region. The coding unit is used as an exemplary block above for pixels within the block to share common coding parameters. Other type of blocks, such as a largest CU or a macroblock used in some coding standards, may also be used.

An exemplary coding table design for syntax elements associated with prediction mode and partition mode incorporating an embodiment of the present invention is shown in Table 2. In this way, the encoder/decoder design is simplified with a single CU mode syntax coding scheme for P and B slices. Table 2 is used to illustrate an exemplary table for CUs of P and B slices to share a same syntax coding table. While specific codes (i.e. bin strings) are designed and assigned to individual prediction mode and partition mode combinations, a skilled person in the art may practice the present invention by using other codes for table for CUs of P and B slices to share a same syntax coding table. For example, the codes in Table 2 can be inverted by changing a "1" to a "0" and a "0" to a "1". Furthermore, other variable length codes may also be used to replace the codes shown in Table 2.

table. In other words, the partition mode for this case is inferred since only 2N×2N PU is allowed. The second syntax coding table for CUs in P and B slices is indicated by another thick-lined box in Table 2. Similarly, for the second coding condition and the third coding condition, two respective syntax coding tables are used as indicated by thick-lined boxes in Table 2, where CUs in P and B slices always share the same syntax coding table.

Figure 3:
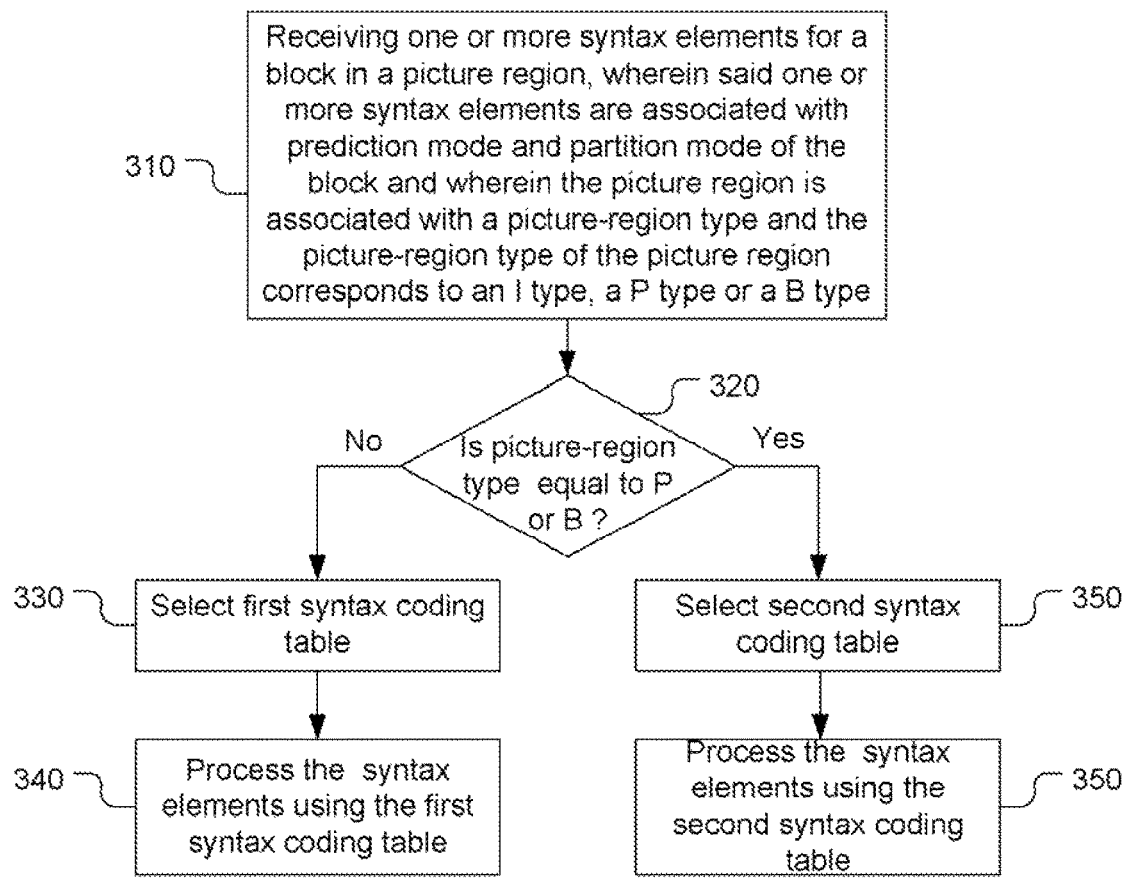
FIG. 3 illustrates an exemplary flow chart for a system incorporating an alternative embodiment of the present invention to allow coding units in P and B slices to share the same syntax coding table.

FIG. 3 illustrates an alternative flow chart for a coding system incorporating the present invention. In step 310, syntax elements associated with CUs in a slice are received, wherein the syntax elements comprise prediction mode and partition mode for the CUs. The picture-region type of the picture region is checked in step 320 to determine whether the picture-region type is P or B. If the picture-region type is neither P nor B, a first table is selected (step 330) and the

TABLE 2

| | | | | Bin string | | |
|---|---|---|---|---|---|---|
| | | | | | cLog2CUSize = = Log2MinCUSize | |
| Slice type | Value of pred_type | PredMode | PartMode | cLog2CUSize > Log2MinCUSize (Condition 1) | cLog2CUSize = = 3 && !inter_4 x4_enabled_flag (Condition 2) | cLog2CUSize > 3 \|\| inter_4x4_enabled_flag (Condition 3) |
| I | 0 | MODE_INTRA | PART_2Nx2N | — | 1 | 1 |
| | 1 | MODE_INTRA | PART_NxN | — | 0 | 0 |
| P/B | 0 | MODE_INTER | PART_2Nx2N | 1 | 1 | 1 |
| | 1 | MODE_INTER | PART_2NxN | 011 | 01 | 01 |
| | 2 | MODE_INTER | PART_Nx2N | 001 | 001 | 001 |
| | 4 | MODE_INTER | PART_2NxnU | 0100 | — | — |
| | 5 | MODE_INTER | PART_2NxnD | 0101 | — | — |
| | 6 | MODE_INTER | PART_nLx2N | 0000 | — | — |
| | 7 | MODE_INTER | PART_nRx2N | 00010 | — | — |
| | 3 | MODE_INTER | PART_NxN | — | — | 0001 |
| | 8 | MODE_INTRA | PART_2Nx2N | 00011 | 000 0 | 0000 0 |
| | 9 | MODE_INTRA | PART_NxN | — | 000 1 | 0000 1 |

The exemplary unified syntax coding table for CUs in P and B slices, as shown in Table 2, includes Intra prediction mode (i.e., MODE_INTRA) for CUs in P and B slices. Nevertheless, the present invention is not limited to the specific prediction modes and partition modes used for CUs in P and B slices. The unified syntax coding table may correspond to entries with less prediction types or more prediction types. For example, the entries corresponding to values of pred_type equal to 8 (MODE_INTRA and PART_2N×2N) and 9 (MODE_INTRA and PART_N×N) may be removed from the table. In this case, the codes in the unified syntax coding table are solely associated with the partition modes for P and B slices.

Figure 2:
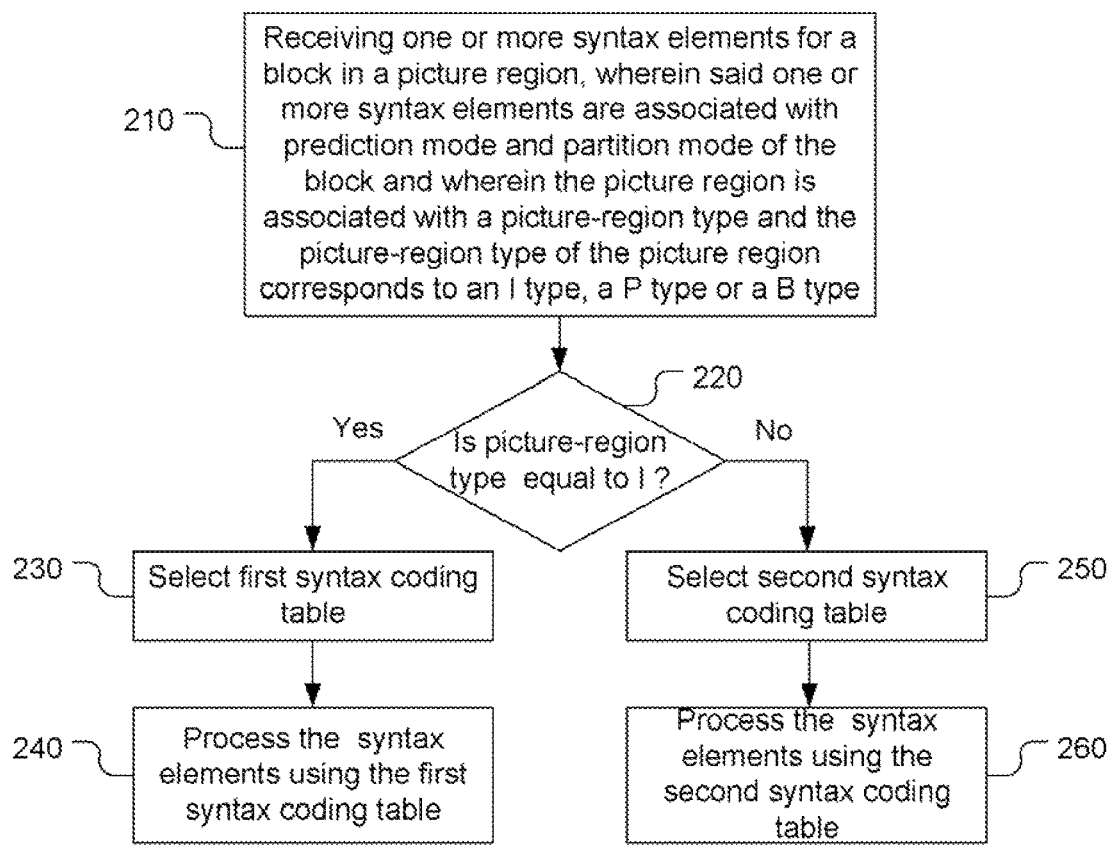
FIG. 2 illustrates an exemplary flow chart for a system incorporating an embodiment of the present invention to allow coding units in P and B slices to share the same syntax coding table.

FIG. 2 illustrates an exemplary flow chart for a coding system incorporating the present invention. In step 210, syntax elements associated with a block in a picture region are received, wherein the syntax elements comprise prediction mode and partition mode for the CUs. The picture region is associated with a picture-region type and the picture-region type of the picture region corresponds to an I type, a P type or a B type. The picture-region type of the picture region is checked in step 220 to determine whether the type is I. If the picture-region type is I, a first syntax coding table is selected (step 230) and the syntax elements are processed using the first syntax coding table (step 240). If the picture-region type is not I, a second syntax coding table is selected (step 250) and the syntax elements are processed using the second syntax coding table (step 260). For the first coding condition, i.e., cLog2CUSize>Log2-MinCUSize, the first syntax coding table as indicated by a thick-lined box in Table 2 is Null, i.e., no code entries in this syntax elements are processing using the first syntax coding table (step 340). If the picture-region type is P or B, a second table is selected (step 350) and the syntax elements are processing using the second syntax coding table (step 360).

The performance of a coding system incorporating an embodiment of the present invention is compared with a reference system based on HEVC Test Model Version 4.0 (HM-4.0), where separate coding tables are used for CUs in P and B slices in HM-4.0. The performance is measured in terms of BD rate, where a negative value implies performance improvement over the reference system. The BD rate comparison is performed by adjusting coding parameters to cause the underlying systems to result in about the same objective quality. The performance results are shown in Table 3 for high efficiency (HE) coding configuration using low-delay P and B pictures. Classes A through E refer to different sets of test video. The results as shown in Table 3 indicate that the simplified system with a unified syntax coding table shared by CUs in P slices and CUs in B slices achieves about the same performance as a conventional system.

TABLE 3

| | Low Delay P HE | | |
|---|---|---|---|
| | Y | U | V |
| Class A | | | |
| Class B | 0.0% | 0.2% | 0.3% |

TABLE 3-continued

| | Low Delay P HE | | |
| --- | --- | --- | --- |
| | Y | U | V |
| Class C | 0.0% | 0.1% | −0.1% |
| Class D | 0.0% | −0.1% | −0.1% |
| Class E | 0.0% | 0.0% | 0.1% |
| Overall | 0.0% | 0.0% | 0.0% |
| Enc Time[%] | | 100% | |
| Dec Time[%] | | 100% | |

In summary, the method and apparatus for syntax element coding selectively apply a syntax coding table to encode or decode the syntax element associated with the partition mode or both the partition mode and prediction mode of a block in a picture region according to the picture-region type. In one embodiment, a first syntax coding table is used to process the syntax element if the picture-region type is an I mode and a second syntax coding table is used to process the syntax element if the picture-region type is not an I mode. In another embodiment, a first syntax coding table is used to process the syntax element if the picture-region type is a P or B mode, and a second syntax coding table is used to process the syntax element if the picture-region type is neither P nor B mode. The picture region may correspond to a slice, a group of coding units (CUs), a group of largest CUs (LCUs), or a title consisting of a first number of CUs vertically and a second number of CUs horizontally. The block may correspond to a coding unit. The partition mode may comprise 2N×2N, 2N×N, N×2N, N×N, 2N×nU, 2N×nD, nL N×2N and nR×2N. The syntax coding table can be different for different coding conditions. The syntax coding table may correspond to a variable length code table or a fixed length code table.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software code, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software code and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for coding of syntax elements, the method comprising:
receiving, by a video coding circuit, one or more syntax elements for a block in a picture region, wherein said one or more syntax elements are associated with a partition mode of the block and wherein the picture region is associated with a picture region type;
determining whether the picture region type of the picture region corresponds to an I type, a P type or a B type;
processing, by the video coding circuit, said one or more syntax elements for I type picture regions utilizing codewords provided by a first syntax coding table; and
processing, by the video coding circuit, said one or more syntax elements for both P type and B type picture regions utilizing codewords provided by a second syntax coding table, wherein the codewords which are utilized to process said one or more syntax elements for each of the P type picture regions are the same as those which are utilized to process said one or more syntax elements for each of the B type picture regions.

2. The method of claim 1, wherein the picture region corresponds to a slice, a group of coding units (CUs), a group of largest CUs, or a tile consisting of a first number of CUs vertically and a second number of CUs horizontally.

3. The method of claim 1, wherein the block corresponds to a coding unit.

4. The method of claim 1, wherein processing said one or more syntax elements comprises one of encoding said one or more syntax elements or decoding said one or more syntax elements.

5. The method of claim 1, wherein the codewords of the second coding table additionally correspond to symmetrical partition and asymmetrical partition modes, with symmetrical partition modes including 2N×2N, 2N×N, N×2N and N×N.

6. The method of claim 5, wherein the asymmetrical partition modes include 2N×nU, 2N×nD, nL N×2N and nR×2N.

7. The method of claim 1, wherein the second syntax coding table is different for a different coding condition.

8. The method of claim 1, wherein the second syntax coding table corresponds to a variable length code table.

9. An apparatus for coding of syntax elements, the apparatus comprising:
a memory configured to store instructions; and
a processor coupled to the memory and configured by the instructions to perform the steps of:
receiving one or more syntax elements for a block in a picture region, wherein said one or more syntax elements are associated with a partition mode of the block and wherein the picture region is associated with a picture region type;

determining whether the picture region type of the picture region corresponds to an I type, a P type or a B type;

processing said one or more syntax elements for I type picture regions utilizing codewords provided by a first syntax coding table; and processing said one or more syntax elements for both P type and B type picture regions utilizing codewords provided by a second syntax coding table, wherein the codewords which are utilized to process said one or more syntax elements for each of the P type picture regions are the same as those which are utilized to process said one or more syntax elements for each of the B type picture regions.

10. The apparatus of claim 9, wherein the picture region corresponds to a slice, a group of coding units (CUs), a group of largest CUs, or a tile consisting of a first number of CUs vertically and a second number of CUs horizontally.

11. The apparatus of claim 9, wherein the block corresponds to a coding unit.

12. The apparatus of claim 9, wherein processing said one or more syntax elements comprises one of encoding said one or more syntax elements or decoding said one or more syntax elements.

13. The apparatus of claim 9, wherein the codewords of the second coding table additionally correspond to symmetrical partition and asymmetrical partition modes, with symmetrical partition modes including 2N×2N, 2N×N, N×2N and N×N.

14. The apparatus of claim 13, wherein the asymmetrical partition modes include 2N×nU, 2N×nD, nL×2N and nR×2N.

15. The apparatus of claim 9, wherein the second syntax coding table is different for a different coding condition.

16. The apparatus of claim 9, wherein the second syntax coding table corresponds to a variable length code table.

* * * * *